Nov. 10, 1931. F. H. BOGART 1,831,225
CHUCK CLOSING AND OPENING MECHANISM
Filed Sept. 23, 1929 5 Sheets-Sheet 1
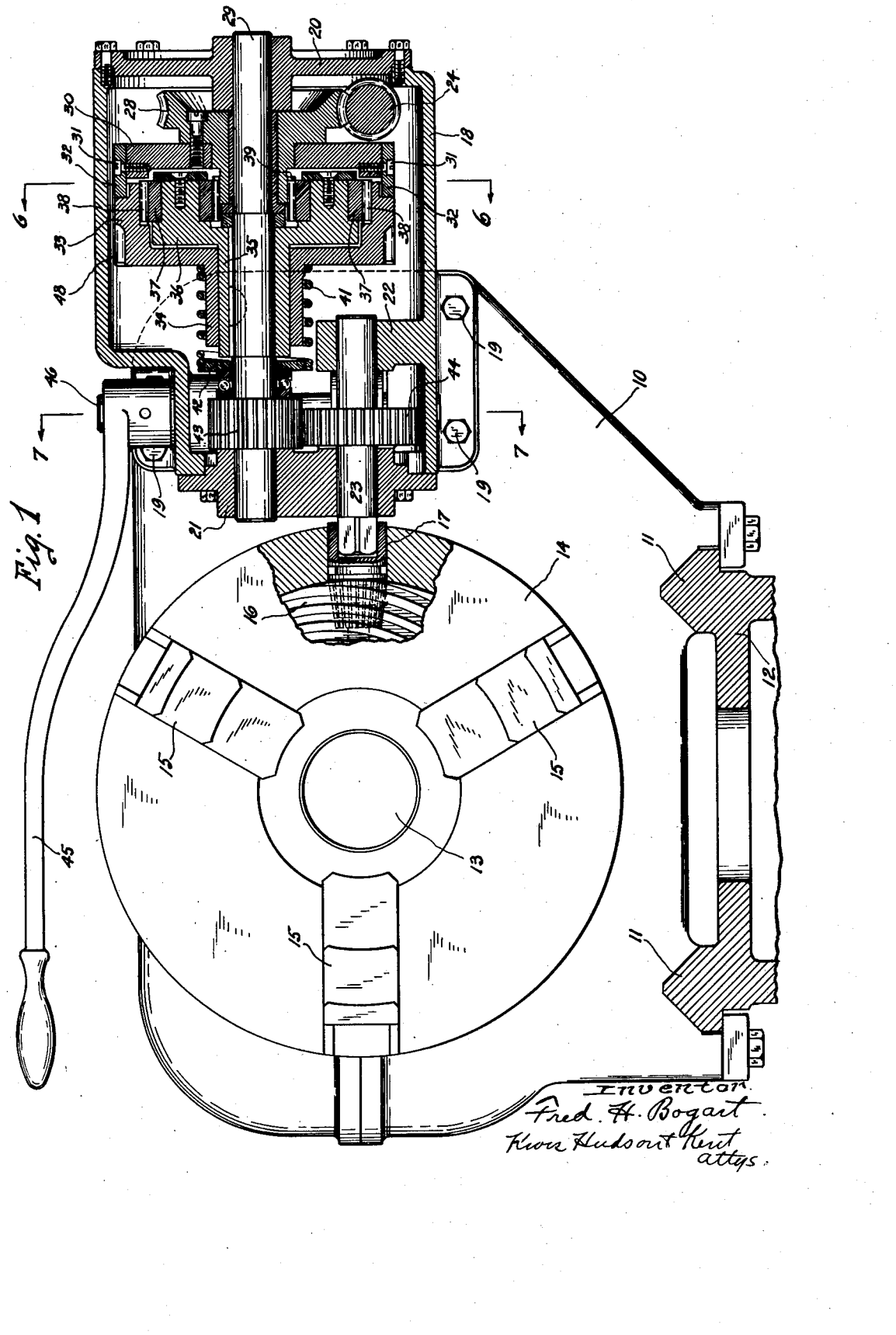

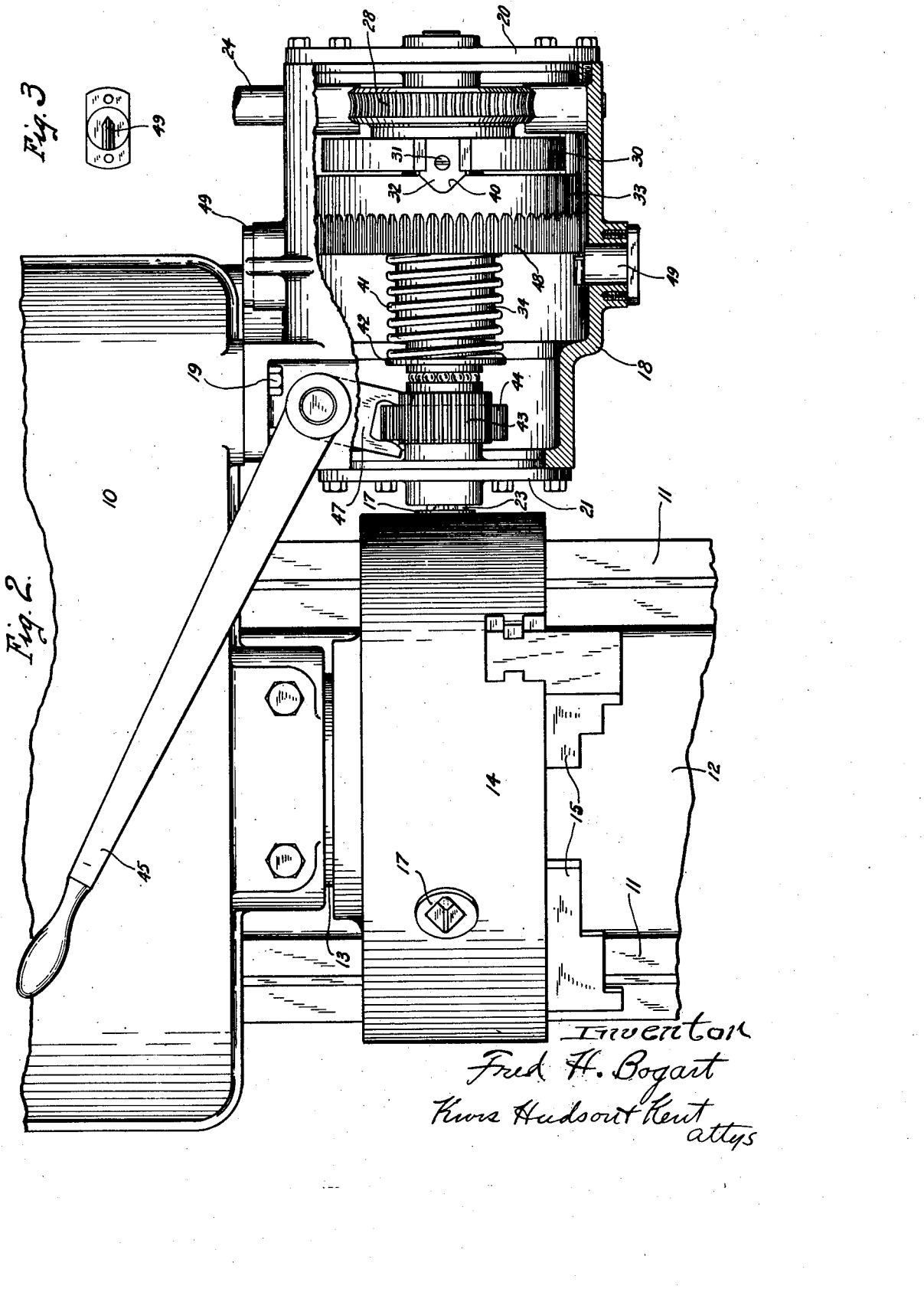

Nov. 10, 1931.  F. H. BOGART  1,831,225
CHUCK CLOSING AND OPENING MECHANISM
Filed Sept. 23, 1929    5 Sheets-Sheet 3
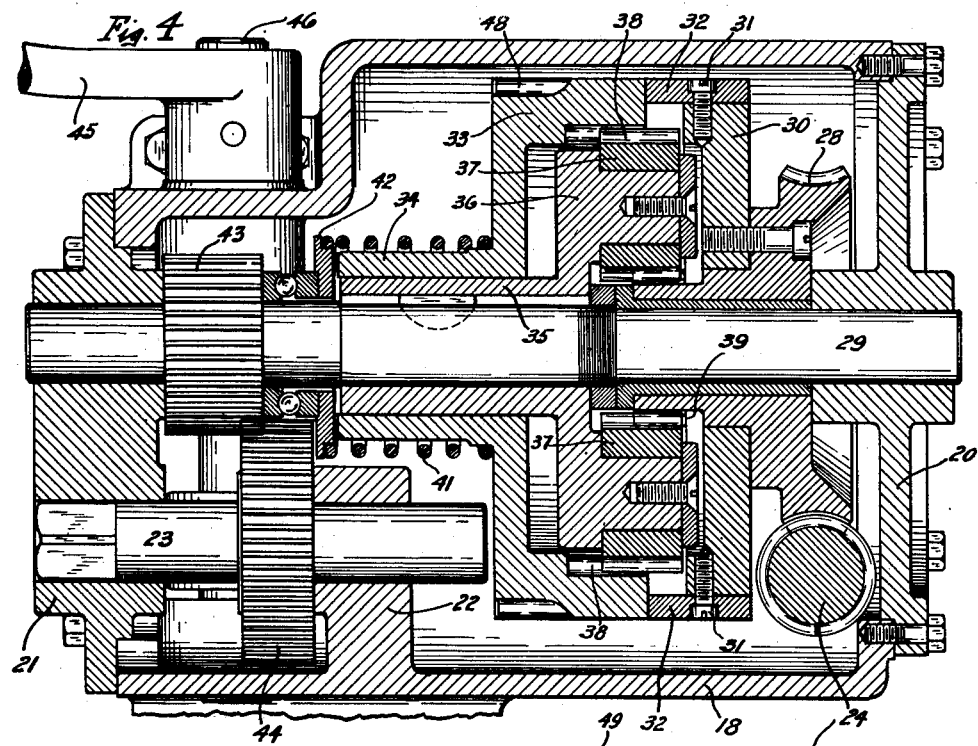
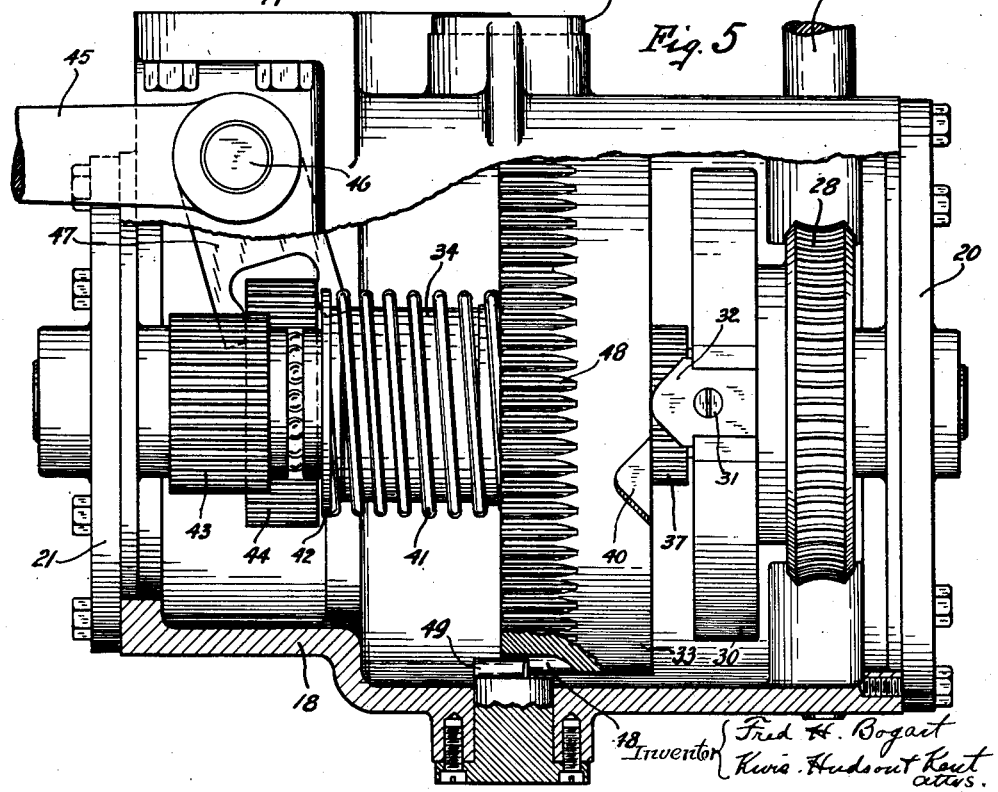

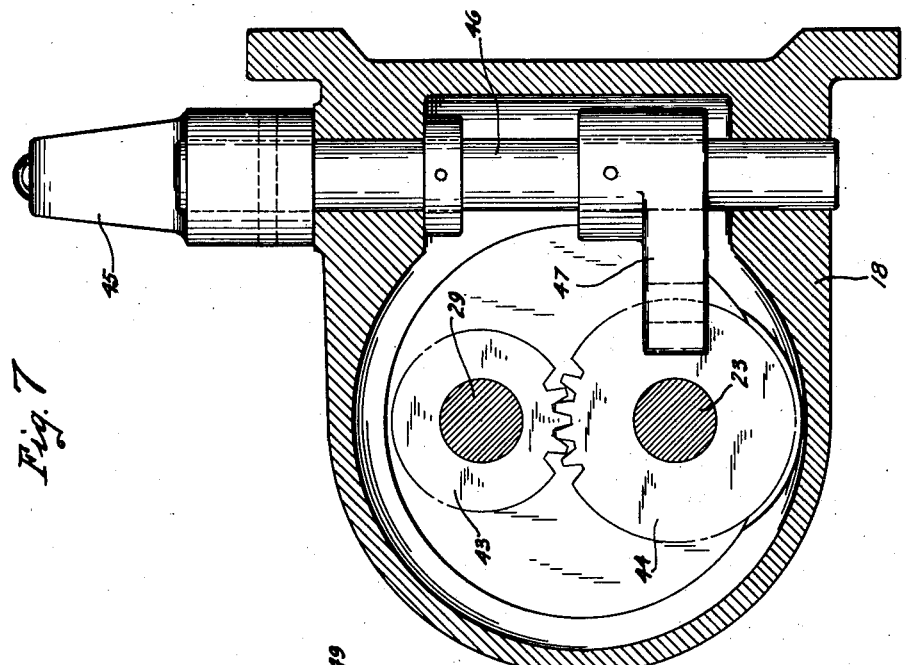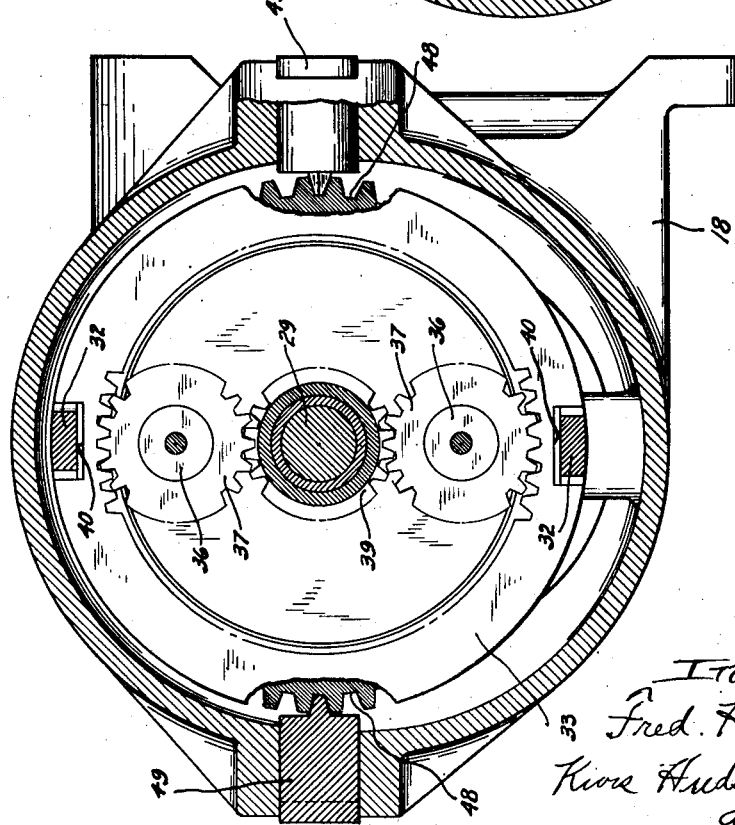

Nov. 10, 1931.   F. H. BOGART   1,831,225
CHUCK CLOSING AND OPENING MECHANISM
Filed Sept. 23, 1929   5 Sheets-Sheet 5
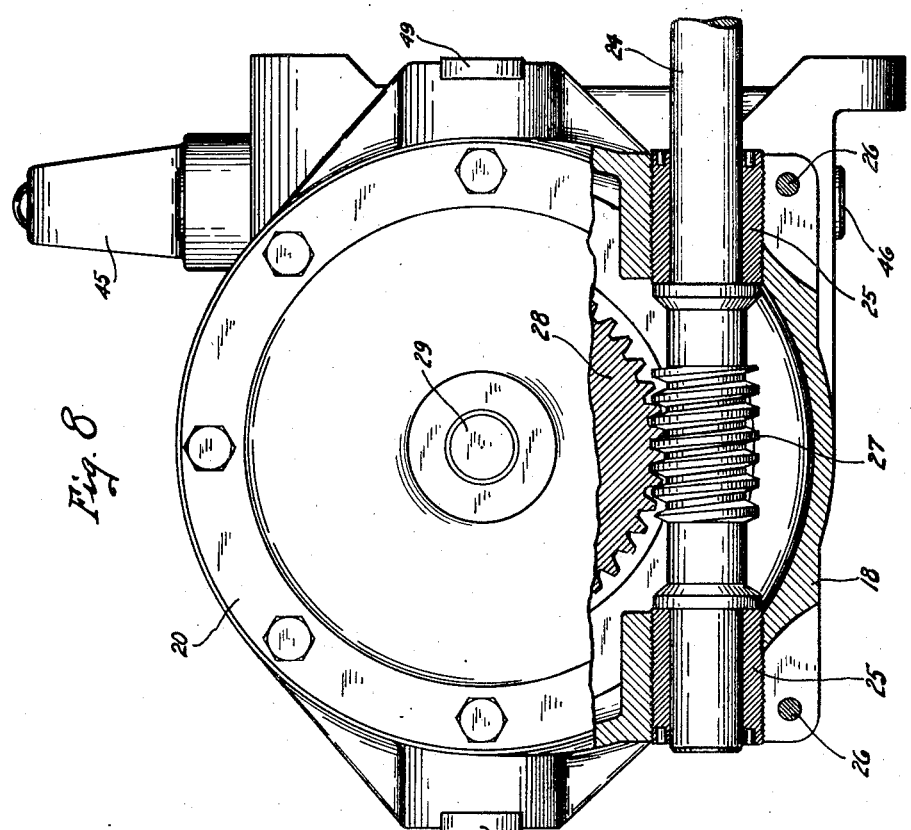
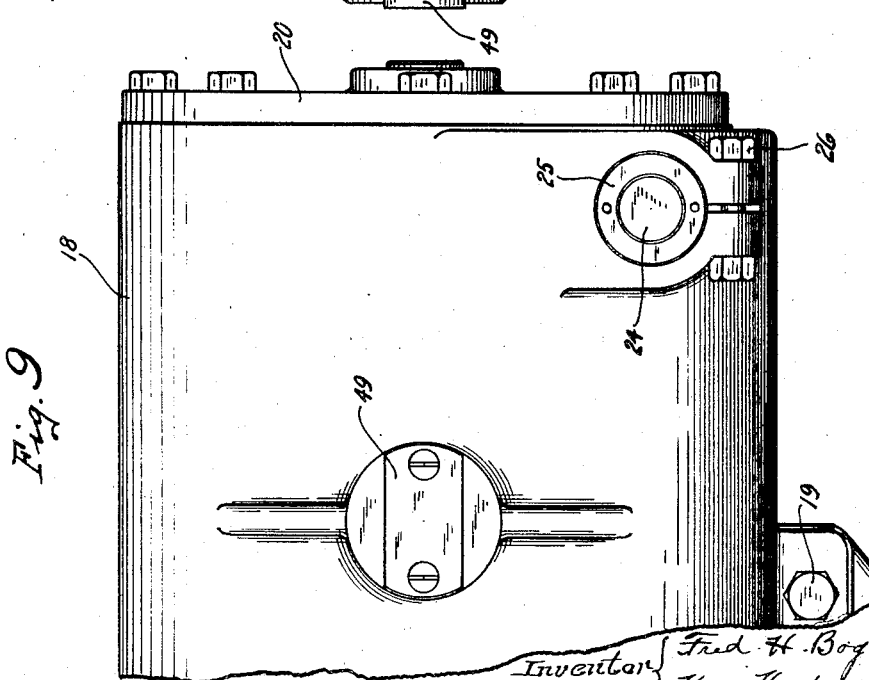

Patented Nov. 10, 1931

1,831,225

UNITED STATES PATENT OFFICE

FRED H. BOGART, OF SHAKER HEIGHTS, OHIO

CHUCK CLOSING AND OPENING MECHANISM

Application filed September 23, 1929. Serial No. 394,623.

This invention relates to chuck closing and opening mechanism for machine tools, and has for one of its objects to provide a mechanism which is preferably power operated, having a chuck actuating member which is operated at relatively high speed in the initial part of the closing operation and then at relatively low speed in the final closing operation and in similar manner but in the reverse order in the chuck opening operation.

In another aspect the invention aims to provide a chuck closing and opening mechanism wherein the chuck actuating member in the form of a wrench is rotated with a light torque while the jaws are approaching the work in the closing operation or receding from the work in the opening operation with an automatic change to a heavy torque during the latter part of the closing operation after the jaws come into engagement with the work and with a similar action but with the change from heavy torque to relatively light torque in the opening operation.

Still further, the invention aims to provide a chuck closing and opening mechanism wherein the jaws of the chuck are caused to travel rapidly during the idle portion of their movement and relatively slowly after they come into engagement with the work in the closing operation and before releasing the work in the opening operation.

A still further object is to provide a chuck closing and opening mechanism wherein there is an automatic change in the ratio of the reduction gearing connecting the wrench to a wrench operated part of the chuck, this change in the ratio of gearing taking place between the idle and active portions of the jaw movement so that the final closing operation and the initial opening operation will be accomplished with a relatively slow but powerful gripping movement of the jaws.

More broadly stated, it is the object to provide a chuck closing and opening mechanism which is efficient from the standpoints of power and time consumption in the closing and opening movements.

The above and other objects are attained by my invention which may be here briefly summarized as consisting in certain novel combinations and arrangements of parts which will be described in the specification and set forth in the appended claims.

My invention may be embodied in several forms but preferably the mechanism is power operated although not necessarily so in so far as certain aspects of the invention are concerned. However it finds its greatest utility when power operated and, when so operated, the wrench operating shaft to which the power is applied may be connected to a driving element in the head of the lathe or other machine tool i. e. to the mechanism which rotates the chuck, or it may be connected to an independent source of power such as an electric air motor or other type of motor. Furthermore, the mechanism may be applied as an attachment to a machine tool, or it may be built into the machine tool when originally constructed, the attachment aspect being herein illustrated.

In the accompanying drawings:

Figure 1 is a view partly in section and partly in elevation, looking toward the front face of the chuck applied to the work spindle of a lathe, the chuck closing and opening mechanism being shown in section with the parts in the relative positions which they occupy during the rapid and less powerful movement of the wrench, or during what was previously termed the idle portion of the jaw movement.

Fig. 2 is a top plan view of the same with the chuck closing and opening mechanism partly in section and with the parts of the mechanism in the same relative positions as shown in Fig. 1.

Fig. 3 is an inner end view of a dog for engaging and locking one element of the chuck closing and opening mechanism at the instant when the conversion in the ratio of the reduction gearing takes place.

Fig. 4 is a view of the chuck closing and opening mechanism detached from the machine and with the parts shown on a larger scale than in Fig. 1, but with the parts in the relative positions which they occupy when the power is transmitted to the wrench through the gearing of the greater ratio when the wrench is rotated relatively slowly but with a greater torque.

Fig. 5 is a detached view of the chuck closing and opening mechanism with the parts shown in plan as in Fig. 2, but in the relative positions corresponding to Fig. 4 i. e. when the wrench is rotated relatively slowly but with a greater torque.

Fig. 6 is a cross sectional view through the chuck closing and opening mechanism along the line 6—6 of Fig. 1, with the parts shown on the same scale as in Figs. 4 and 5.

Fig. 7 is a cross sectional view along the line 7—7 of Fig. 1, the parts on the same scale as in Figs. 4, 5 and 6.

Fig. 8 is an end view looking toward the left of Fig. 1, with the parts in section; and Fig. 9 is a fragmentary front elevation as the same would be viewed looking toward the front face of the chuck, Figs. 8 and 9 being on the same scale as Figs. 4 to 7.

Referring now to the drawings, I have, as before stated, shown my invention in the form of an attachment which is secured to the head 10 of a lathe which is mounted upon the ways 11 of the bed, a portion of which is shown at 12. In so far as the machine tool is concerned, it may be of any suitable construction and obviously need not be in the form of a lathe. The work spindle is indicated at 13 in Fig. 1 and secured to the spindle is a work holding chuck 14 which may be of any suitable construction. In this instance a standard scroll chuck is indicated having a number of jaws 15 adapted to be actuated by a scroll, a portion of which is indicated at 16, and adapted to be rotated as is the case with standard scroll chucks by any one of a series of radially disposed pinions 17 mounted in the peripheral portion of the chuck body.

In this instance the attachment includes a housing 18 which is secured by bolts 19 to a pad formed on the front face of the head 10, the housing being preferably substantially cylindrical in shape with ends 20 and 21 in which parts of the mechanism are supported. The end 21 of the housing is located close to and opposite the periphery of the chuck body, as clearly shown in Figs. 1 and 2, and movable endwise and also rotatably supported by end 21 and by a bearing 22 is a wrench spindle 23. This spindle whose forward end is given a wrench shape so that it may be moved into a substantially rectangular socket formed in each of the pinions 17 is adapted to be withdrawn into the housing so as to be clear of the chuck, as indicated in Fig. 4, and to be moved outwardly so as to engage the pinion as shown in Fig. 1. The power is supplied for rotating the wrench from a shaft 24 which may be rotated, when the chuck is to be closed or opened in any suitable manner as already stated, but for the sake of simplicity a fluid pressure motor as a source of power is preferred although that form of power is unnecessary. The chief advantage of the fluid pressure motor lies in the fact that at the end of the closing operation the motor will stall without injury to any of the parts. In the event that the shaft 24 is rotated by an electric or other type of motor or by some power driven element of the machine tool, such as by a gear in the head 10, a slipping device will be provided at any suitable point in advance of the housing 18 so that at the end of the closing operation a slippage will occur which will prevent breakage or injury to the mechanism or to the driving part.

The shaft 24 is mounted in adjustable bearing bushings 25 which can be released for adjustment or clamped in position by clamping bolts 26, indicated in Figs. 8 and 9. In the housing this shaft has a worm 27 which engages a worm wheel 28 adapted to rotate on a shaft 29 rotatably supported in the end members 20 and 21 of the housing 18, this shaft 29 lying above and at right angles to the shaft 24. The worm wheel 28 has secured to it a disc 30 to the periphery of which is secured, by screws 31, a pair of oppositely disposed driving dogs 32 which, during the rapid and less powerful rotation of the wrench, are adapted to rotate an internal gear member 33. This internal gear member has a hub or sleeve-like extension 34 which is adapted to turn on and to move endwise on the hub or sleeve-like extension 35 of a pinion carrier 36 which is keyed to the shaft 29 and carries a series of pinions 37 which engage the teeth 38 of the internal gear member 33 and also engage pinion teeth 39 formed on the inner end of the worm wheel 28.

The peripheral part of the internal gear member 33 is provided with notches 40 corresponding in shape to the forward ends of the dogs 32 carried by the disc 30 and when the dogs engage in these notches the drive is direct from the worm wheel 28 and disc 30 to the pinion carrier 36 and therefore to the shaft 29 through the dogs 32, the pinions 37 then being held against rotation and acting as keys or locks between the internal gear member 33 and the pinion 39 at the inner end of the worm wheel. The internal gear member is normally held in the position shown in Figs. 1 and 2 with the notches 40 in full engagement with the dogs 32 by means of a spring 41 which surrounds the sleeve-like extension 34 of the internal gear member 33 and engages at its non-expanding end an abutment in the form of a disc 42. In this instance I show two oppositely disposed notches 40, but in some instances I may employ more than two of these notches.

When the drive takes place from worm wheel 28 to shaft 29 as just stated, it is obvious that the shaft 29 rotates at the same speed as the worm wheel 28, the rotation of the worm wheel and shaft being transmitted to the wrench by two spur gears consisting of a gear 43 on shaft 29 and a gear 44 on the wrench 23. There is a sufficient space between the end member 21 and the bearing 22 so that the wrench with the gear 44 may be moved into and out of engagement with a pinion 17 of the chuck without disengaging the gearing 43 and 44 as will be seen by comparison of Figs. 1 and 4. This endwise movement of the wrench is accomplished manually, in this instance, by a hand lever 45 which is in convenient position for operation by the operator, as it extends forward to the front of the lathe above the chuck. This lever is fixed to a rock shaft 46 journalled in the inner portion of the housing 18 and provided at its lower end with a yoke 47 which straddles the gear 44 as indicated in Figs. 2, 5 and 7. It will be understood that by movement of the hand lever 45 from the position shown in Fig. 5 to the position shown in Fig. 2 the wrench will be moved from its full retracted position to its outermost position in full engagement with the pinion 17 of the chuck, as shown in Fig. 1, and by reverse movement of the lever the wrench will be withdrawn so that the chuck may be rotated. It will be understood, of course, that when the wrench is moved into and out of engagement with the pinion of the chuck the chuck is stationary and the wrench is not rotating. The wrench may be rotated slowly, however, to bring the square portion of the wrench into alignment with the square socket in the pinion.

This direct drive just explained from the worm wheel 28 to the shaft 29 and by the gears 43 and 44 to the wrench 23 is utilized when the jaws of the chuck are moving through what was previously termed the idle portion of their radial movement, i. e., toward the work in the chuck closing operation and away from the work after the jaws have disengaged the work in the opening operation. The pressure exerted by the spring 41 is, during the idle movement of the jaws, sufficient to hold the internal gear member 33 in its right hand position with the notches 40 in full engagement with the dogs as indicated in Fig. 2. However, in the closing operation as soon as one or more of the jaws come in contact with the work the resistance to the rotation of the wrench is increased sufficiently that the wrench by the direct drive just explained does not have sufficient torque to further actuate the jaws. As soon as this occurs the internal gear member 33 is cammed outward or to the left as the same is viewed in Figs. 1 and 5, compressing the spring 41. When the internal gear member 33 is cammed outward in this manner, it is instantly locked against rotation by reason of the fact that teeth 48 formed on the periphery of this internal gear member slide into locking engagement with a pair of locking pawls 49 which are mounted opposite each other in the cylindrical wall of the housing 18. The free ends of the teeth 48 and the adjacent ends of the locking pawls 49 are suitably beveled so that the pawls and the teeth will readily slide into interlocking engagement when the internal gear member is cammed outward as just explained.

As soon as the internal gear member is thus locked against rotation the dogs 32 will ride on the flat face of the internal gear member as clearly shown in Fig. 5, and when this occurs, or during the relative movement between the now stationary internal gear member 33 and the disc 30 and worm wheel 28 the power is transmitted from the worm wheel to the shaft 29 through gearing of a low speed ratio i. e., through the planetary gearing including the gear teeth 39 formed on the inner end of the worm wheel, the pinions 37, and the stationary internal gear member 33. As soon as this gearing becomes effective the wrench spindle is rotated relatively slowly but with relatively high torque, thus insuring ample power for the final closing operation wherein the jaws grip the work. At the end of the closing operation the rotation of the wrench is stopped by the stalling of the motor in case a fluid presure motor is connected to shaft 24, or by the slipping of the slipping device in the event that the shaft is driven in some other manner, as for example in the ways explained. The operator will then shut off the power previously applied to shaft 24 and throw the lever 45 so as to withdraw the wrench from the chuck. The disc 30 and internal gear member 33 will generally remain in their separated position indicated in Fig. 5 between the closing and opening operations.

When the operator desires to open the chuck he will again shift the lever 45 so as to engage the wrench with a pinion of the chuck and apply the power in the reverse direction to the shaft 24 and during the initial opening operation when considerable power is required the wrench will be turned relatively slowly but with a high torque due to the reduction obtained by the planetary gearing until the dogs 32 (now moving in the opposite direction) come into alignment with the notches 40 of the internal gear member 43 and, as soon as this occurs, the spring 41 throws the internal gear member 33 to the right, or to the position indicated in Figs. 1 and 2, whereupon the planetary gearing is thrown out of action and the wrench is rotated rapidly and with a relatively light torque to move the jaws to a position depending upon the nature of the work and to allow removal of the work.

Thus it will be seen that I have provided a chuck closing and opening mechanism wherein during the idle portion of the movement of the jaws either inward or outward, the jaws move very rapidly as is desirable to conserve time, but when more power is required both in the final closing operation and in the initial part of the opening operation, the ratio of the gearing is automatically changed so that the wrench will be rotated relatively slowly but with the greatly increased torque necessary to cause the jaws to firmly grip the work or to release the work. That is to say, when little power is required the jaws are given a rapid movement until greater power is required when this is automatically provided for by the change in the ratio of the reduction gearing.

While I have shown only one construction, it will be obvious that many of the details including form of gears etc., may be modified and it will be recalled also from the early part of the specification that the device need not be in the form of an attachment but may be built into a machine tool as an initial integral part thereof and that the source of power which is applied to the chuck closing and opening mechanism may be modified or assume different forms. I therefore aim in my claims to cover all modifications which do not involve a departure from the spirit and scope of the invention as defined in the appended claims.

Having thus described my invention, I claim:

1. In combination with a chuck, a chuck closing and opening mechanism including an operating device movable into and out of engagement with a part of the chuck, and means by which said device is caused to operate relatively rapidly during the idle portions of the chuck jaw movements and relatively slowly when the jaws are in engagement with the work.

2. In combination with a chuck, a chuck closing and opening mechanism comprising a chuck operating device movable into and out of engagement with a part of the chuck, and means by which said device is operated with relatively low torque during one part of the chuck jaw movement and with relatively great torque during another portion of the chuck jaw movement.

3. In combination with a chuck, a chuck closing and opening mechanism having a rotary jaw actuating device movable into and out of engagement with a part of the chuck, and means by which the torque applied to said device is automatically increased as the resistance to movement is increased.

4. In combination with a chuck, a chuck closing and opening mechanism comprising a jaw actuating device movable into and out of engagement with a part of the chuck, a member for operating it, and automatically acting reduction gearing between said device and the operating member.

5. In combination with a chuck, a chuck closing and opening mechanism comprising a jaw actuating device movable into and out of engagement with a part of the chuck, an operating member therefor, and reduction gearing of different ratios between said device and member.

6. In combination with a chuck, a chuck closing and opening mechanism comprising a jaw actuating device movable into and out of engagement with a part of the chuck, a member for operating it, and automatic means for increasing the effective operating leverage between said member and said device.

7. In combination with a chuck, a chuck closing and opening mechanism comprising a jaw actuating device movable into and out of engagement with a part of the chuck, a member for operating the same, and automatic speed and torque changing transmission means between said operating member and actuating device.

8. In a chuck closing and opening mechanism, a rotary and endwise movable wrench, a shaft for rotating the same, and means acting responsively to the resistance encountered by the wrench for changing the torque relation between the shaft and wrench.

9. A chuck closing and opening mechanism comprising an endwise movable and rotary wrench, a shaft for rotating the same, and automatically controlled speed reducing and torque increasing transmission means between the shaft and wrench.

10. In a chuck closing and opening mechanism, and endwise movable and rotary wrench, a shaft for operating the same, gearing for connecting the shaft to the wrench, and additional gearing for increasing the torque applied to the wrench for the final closing or initial opening operation.

11. A chuck closing and opening mechanism comprising an endwise movable and rotary wrench, a power shaft, gearing for rotating it, additional gearing for increasing the torque applied to the wrench, and means responsive to the resistance encountered by the wrench for controlling said additional gearing.

12. A chuck closing and opening mechanism comprising a chuck actuating device, a member for operating it, speed and leverage changing means between the operating member and the chuck actuating device, and means including a yieldable member responsive to increased resistance on the chuck actuating device for rendering said speed and leverage changing means effective.

13. A chuck closing and opening mechanism comprising a rotary wrench, a power shaft for operating it, speed and torque changing means between said shaft and wrench, and a yieldable member responsive to the resistance encountered by said wrench for rendering said means effective.

14. In a chuck closing and opening mechanism, a rotary wrench, a power shaft for operating it, means between said shaft and wrench for transmitting power from the former to the latter and including speed and torque changing mechanism, the latter comprising a member adapted at times to rotate and at times to be held stationary.

15. In a chuck closing and opening mechanism, a rotary wrench, a power shaft for operating it, power transmitting means between the shaft and wrench and including planetary reduction gearing, and means by which said gearing is rendered effective by increased resistance encountered by the wrench.

16. In a chuck closing and opening mechanism, a rotary wrench, a power shaft, power transmitting means between the two including reduction gearing at times effective and at times ineffective depending upon the resistance to rotation encountered by the wrench, said gearing including two members which when the gearing is ineffective rotate in unison, and means by which they may be cammed apart to cause one of said members to be held stationary.

17. In a chuck closing and opening mechanism, a rotary wrench, a power shaft, power transmitting means between the wrench and the power shaft including reduction gearing at times effective and at times ineffective depending upon the resistance to rotation encountered by the wrench, means by which said reduction gearing is rendered effective including two members both of which rotate when the reduction gearing is ineffective, and means for holding one of said members stationary.

18. In a chuck closing and opening mechanism, a rotary wrench, a power shaft, power transmitting means between the wrench and the power shaft including reduction gearing at times effective and at times ineffective depending upon the resistance of rotation encountered by the wrench, two members both of which rotate when the reduction gearing is ineffective, and means for moving one of said members away from the other so as to cause it to be held against rotation to render the reduction gearing effective.

19. In a chuck closing and opening mechanism, a rotary wrench, a power shaft, power transmitting means between the wrench and the power shaft including reduction gearing at times effective and at times ineffective depending upon the resistance to rotation encountered by the wrench, means by which said reduction gearing is rendered effective including two members both of which rotate when the reduction gearing is ineffective, and means for camming one of said members away from the other so that it will be held against rotation, the camming means including a plurality of notches on one of said members and one or more dogs on the other member adapted to register with the notches and to move out of engagement therewith.

In testimony whereof, I hereunto affix my signature.

FRED H. BOGART.